United States Patent
Shibayama et al.

(10) Patent No.: US 6,910,572 B2
(45) Date of Patent: Jun. 28, 2005

(54) CONVEYOR CHAIN

(75) Inventors: Katsutoshi Shibayama, Osaka (JP);
Yoshihiro Murakami, Osaka (JP);
Hajime Ozaki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/622,927

(22) Filed: Jul. 19, 2003

(65) Prior Publication Data

US 2004/0149548 A1 Aug. 5, 2004

(30) Foreign Application Priority Data

Oct. 3, 2002 (JP) ........................................ 2002-291554

(51) Int. Cl.[7] .............................................. B65G 15/30
(52) U.S. Cl. .................................... 198/844.1; 198/850
(58) Field of Search ...................... 198/831, 850–853, 198/844.1

(56) References Cited

U.S. PATENT DOCUMENTS

| | | | | | |
|---|---|---|---|---|---|
| 4,645,070 | A | * | 2/1987 | Homeier | 198/831 |
| 4,893,709 | A | | 1/1990 | Schroeder | |
| 5,174,439 | A | * | 12/1992 | Spangler et al. | 198/853 |
| 5,419,428 | A | * | 5/1995 | Palmaer et al. | 198/831 |
| 5,775,480 | A | * | 7/1998 | Lapeyre et al. | 198/853 |
| 5,921,379 | A | * | 7/1999 | Horton | 198/852 |
| 6,180,039 | B1 | * | 1/2001 | Sanduja et al. | 264/211 |
| 6,357,581 | B1 | * | 3/2002 | Guldenfels | 198/853 |
| 6,382,404 | B1 | * | 5/2002 | Guldenfels | 198/850 |
| 6,386,355 | B1 | * | 5/2002 | Willems | 198/852 |
| 6,484,379 | B2 | * | 11/2002 | Palmaer | 198/778 |
| 6,585,110 | B2 | * | 7/2003 | Layne et al. | 198/852 |
| 6,732,856 | B2 | * | 5/2004 | Maine, Jr. | 198/850 |
| 6,749,059 | B2 | * | 6/2004 | Gundlach et al. | 198/851 |

FOREIGN PATENT DOCUMENTS

| | | |
|---|---|---|
| JP | 60-855514 | 6/1985 |
| JP | 07-061550 | 3/1995 |

* cited by examiner

*Primary Examiner*—Richard Ridley
(74) *Attorney, Agent, or Firm*—Woodling, Krost and Rust

(57) ABSTRACT

A conveyor chain, which can be conveyed without being felled down in a curved conveying section even if the speed of the conveying line is increased is provided. A conveyor chain has a plurality of links (11) arranged in rows. Each of said links includes a top plate (12) having a flat top surface (13) and a hinge portion (14) provided on the top plate. The hinge portion is connected to the hinge portions in the adjacent link positioned on the backside by a pin. Engagement portions (14, 15, 21, 22) with the adjacent links positioned on the front and back sides in said top plate include flat surface portions (27~30) connected to the flat top surface of the top plate, and the flat surface portions are extended to said adjacent link, positioned on the front or back side with respect to the central axis of the pin. Accordingly, when the link is passed through a curved conveying section, the engagement portions are overlapped with each other and do not produce a space between links, which changes the positions of conveying objects.

2 Claims, 4 Drawing Sheets

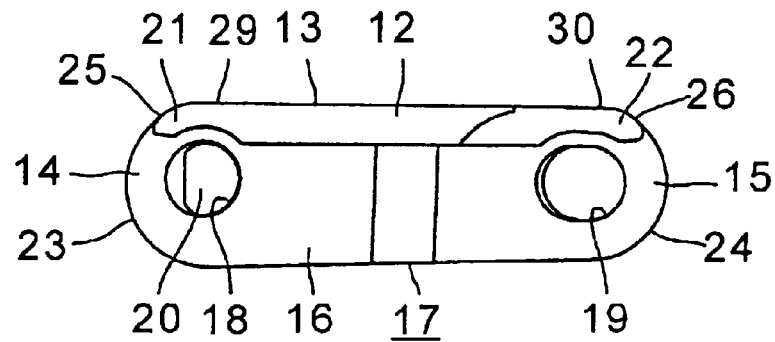
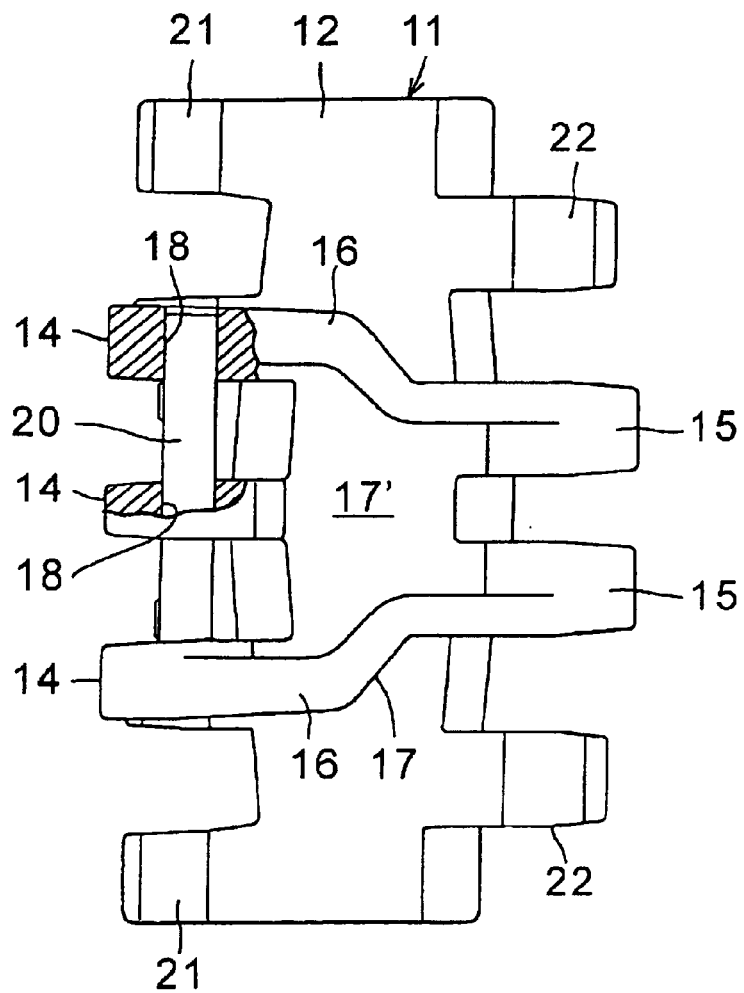

CONVEYOR CHAIN

This application claims the benefit of Japanese Patent Application 2002-291554 filed Oct. 3, 2002.

TECHNICAL FIELD TO WHICH THE INVENTION PERTAINS

The present invention relates to a conveyor chain, and more specifically relates to a chain suitable for a chain conveyor, which conveys objects in a curve.

RELATED ART

A curved conveying conveyor chain conventionally comprises links arranged in rows and pins, which connect links as set forth in U.S. Pat. No. 4,893,709. Each link includes a top plate having a flat top surface. Further, a hinge portion is integrally formed below the top plate.

The hinge portion has a front hinge on the leading edge side and a rear hinge on the trailing edge side. A chain is formed by engaging a front hinge with a rear hinge of a link positioned on the front side, and engaging a rear hinge with a front hinge of a link positioned on the back side, and by inserting a connecting pin in pin holes in hinges.

A conveyor is formed by inserting a hinge portion between a pair of guide rails, contacting the upper surfaces of the guide rails with the lower surfaces of the top plates, engaging a pawl of a sprocket with a groove arranged between the front hinge and rear hinge in the hinge portion and wrapping a chain around the sprocket.

U.S. Pat. No. 4,893,709 to Schroeder et al. discloses article carrying chain which includes a plurality of interconnected molded plastic chain link assemblies.

Problems to be Solved by the Invention

Such a chain is passed through a curved conveying section, each link is displaced by a clearance between a pin and a pin hole. Then, each link is inclined in a horizontal direction to produce a gap, which is narrow inside the curved conveying section and wide outside, between the links. On the other hand, when a conveying object is passed through the curved conveying section, it receives an action of external force such as centrifugal force and is moved on the chain. Thus, the conveying object drops down into the gap between links and changes the position rapidly. As a result it falls.

To improve this problem soapy water is flushed on the top surface of the top plate to decrease friction between a conveying object and a link, and various improvements are added to the material of the link to obtain low friction. Accordingly, when external force is acted on the conveying object, the conveying object is adapted to be able to smoothly move to the adjacent link.

However, when the speed of a conveying line is increased, external force is also increased. Thus, falling of the conveying object often occurs, which leads to limited measurements so that the conveying speed cannot be further increased. Further, conveying objects having high positions of center of gravity, which are felled down by slight inclination of the positions, such as pet bottles, have been increased. As a result it is desired that such conveying objects can be conveyed stable manner and at high speed.

Accordingly, the object of the present invention is to provide an improved conveyor chain, which can be conveyed without being felled down in a curved conveying section even if the speed of the conveying line is increased.

Means for Solving the Problems

To attain the above-mentioned object, in the present invention a conveyor chain having a plurality of links arranged in rows, each of said links including a top plate having a flat top surface and a hinge portion provided on said top plate, said hinge portion being pin-connected to the hinge portions in the adjacent link positioned on the back side, is characterized in that engagement portions with the adjacent links positioned on the front and back sides in said top plate include flat surface portions connected to said flat top portion of said top plate, said flat surface portions are extended to said adjacent link, which is positioned on the front or back side with respect to the central axis of said pin and that when said link is passed through a curved conveying section, said engagement portions are overlapped with each other.

Action

In the conveyor chain of the present invention having a plurality of links arranged in rows, each of said links including a top plate having a flat top surface and a hinge portion provided on said top plate, said hinge portion being pin-connected to the hinge portions in the adjacent link positioned on the back side, engagement portions with the adjacent links positioned on the front and back sides in said top plate includes a flat surface portion connected to said flat top portion of said top plate, said flat surface portion are extended to said adjacent link, which is positioned on the front or back side with respect to the central axis of said pin and that when said link is passed through a curved conveying section, said engagement portions are overlapped with each other. Accordingly, even if the link is moved in an inclined manner in a horizontal direction in a curved conveying section, the gap between links is reduced, and an area near the pin reaches a flat surface substantially flush with the top surface of the top plate. Therefore, even if a conveying object on the link is subjected to the action of external force when passing through the curved conveying section, it does not fall down and is smoothly moved to the adjacent link.

The invention will be better understood when reference is made to the BRIEF DESCRIPTION OF THE DRAWINGS, DETAILED DESCRIPTION OF THE INVENTION and CLAIMS which follow hereinbelow.

BRIEF DESCRIPTION OF THE DRAWINGS

FIG. 3 is a side view of a link forming the conveyor chain shown in FIG. 1.

FIG. 4 is a partially cutaway view of the link forming the conveyor chain shown in FIG. 1.

A better understanding of the invention will be had when reference is made to the DETAILED DESCRIPTION OF THE INVENTION and CLAIMS which follow hereinbelow.

DETAILED DESCRIPTION OF THE INVENTION

Embodiments of the Invention

An embodiment of a conveyor chain according to the present invention will be described below with reference to FIGS. 1 to 5.

Figure 1:
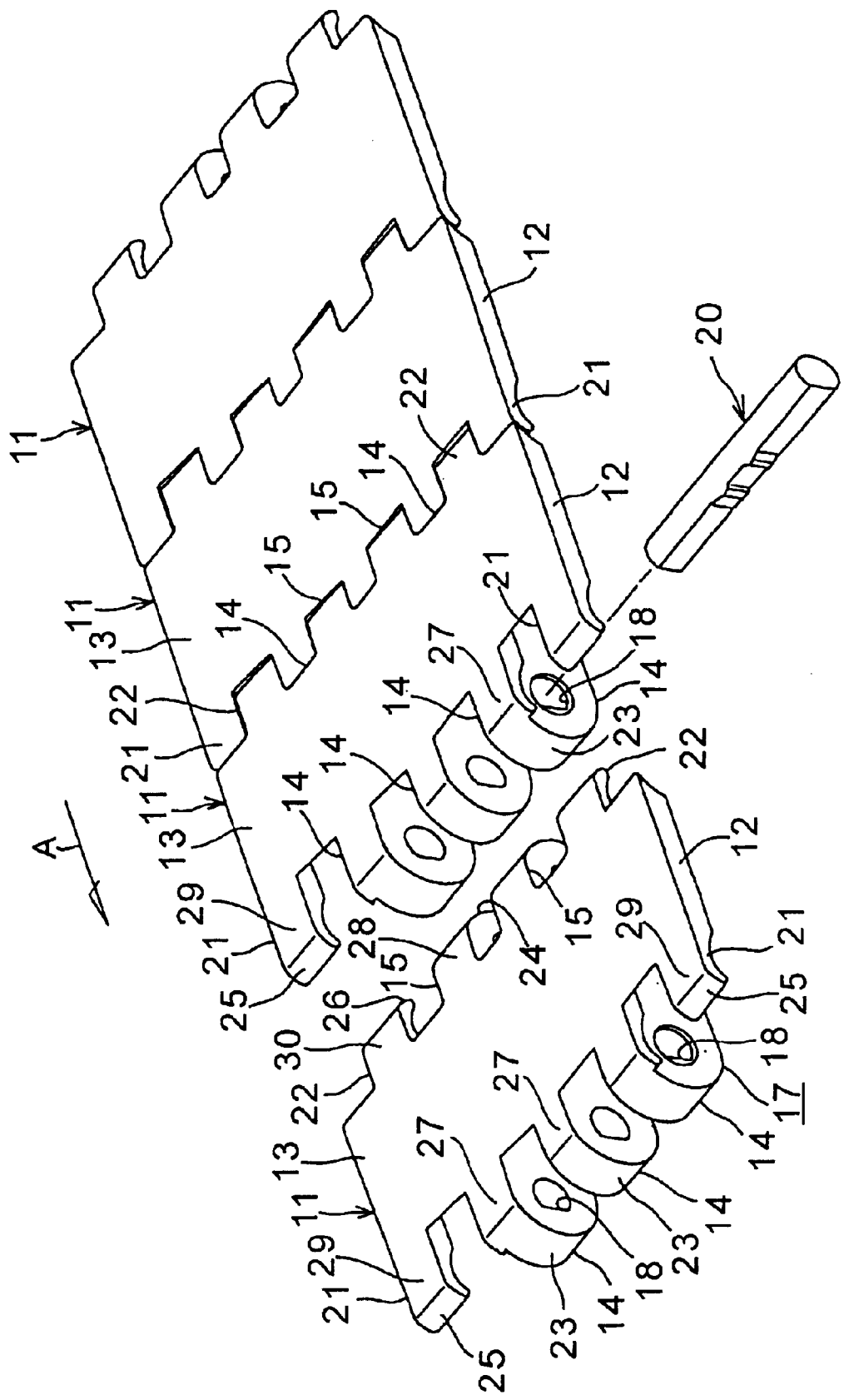
FIG. 1 is an exploded perspective view showing an embodiment of a conveyor chain according to the present invention.

This conveyor chain is moved from left to right as shown by the arrow A in FIG. 1.

The conveyor itself comprises a plurality of links 11. Each of the links 11 consists of an engineering plastic and includes a top plate 12. The top plate is of a plate-shaped form having a flat top surface 13.

Figure 2:
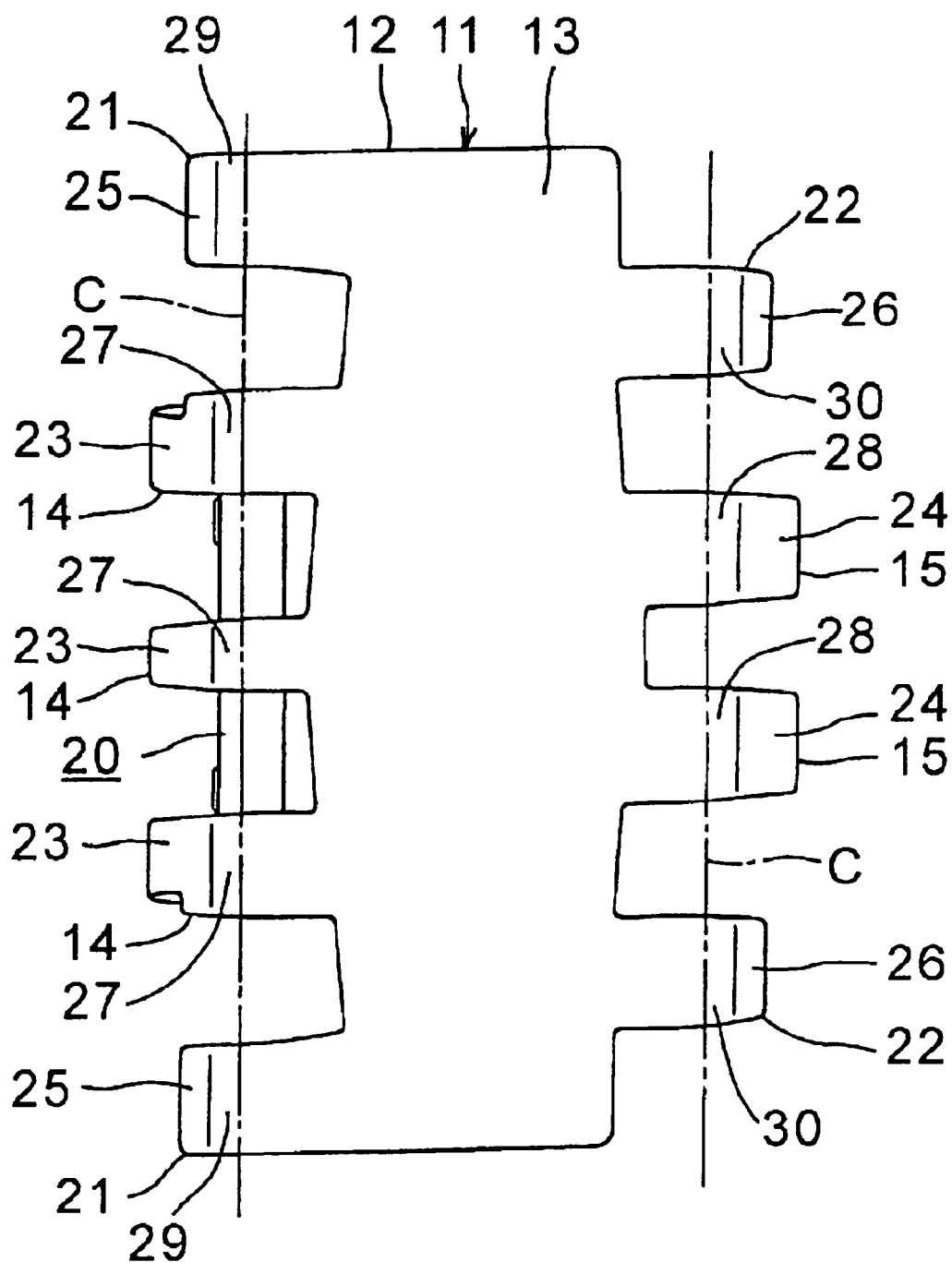
FIG. 2 is a top surface of the conveyor chain shown in FIG. 1.

As shown in FIG. 2, the leading edge of the top plate 12 is provided with front hinges 14 and the trailing edge thereof is provided with rear hinges 15. In this embodiment there are three front hinges 14 and two rear hinges 15. The front hinges 14 are arranged at portions near the center of the leading edge of the top plate 12. Each rear hinge is arranged on the trailing edge side of the top plate 12 in such a manner that it is positioned between the front hinges 14. As shown in FIGS. 3 and 4, the front hinges 14 and rear hinges 15, positioned at the outermost sides are respectively connected to each other by walls 16 extending from the lower surface of the top plate 12 to form one hinge portion 17. Each of the front hinges 14 is provided with a pin hole 18. Further, each of the rear hinges 15 is provided with a bushing hole 19, as shown in FIG. 3.

There are a front dummy hinge 21 and a rear dummy hinge 22 on both sides of the hinge portion 17. These dummy hinges 21, 22 are each formed as a part of the top plate 12 and are separate from the hinge portion 17. The front dummy hinge 21 forms a space outside the front hinge 14 between the front hinge 14 and the front dummy hinge 21 and is provided on the leading edge of the top plate 12. The rear dummy hinge 22 is positioned between the front hinge 14 and the front dummy hinge 21 and is provided on the trailing edge of the top plate 12. The space width or groove width between the front dummy hinge 21 and the front hinge 14 is wider than the width of the rear dummy hinge 22, and the space width or groove width between the rear dummy hinge 22 and the rear hinge 15 is slightly wider than the width of the front hinge 14.

A chain is formed in such a manner that the rinks 11 are adjacently arranged, the front hinge 14 and the front dummy hinge 21 are engaged with the rear hinge and rear dummy hinge of the front adjacent link, respectively, and the rear hinge 15 and the rear dummy hinge 22 are engaged with the front hinge and front dummy hinge of the rear adjacent link, respectively, and that a pin 20 is inserted into pin holes 18, 19 of a front hinge 14 and the rear hinge of the front adjacent link, respectively, and a pin 20 is inserted into pin holes 18, 19 of a front hinge of the adjacent link positioned on the rear side of a rear hinge 15, respectively, whereby all links 11 are connected to each other.

In this conveyor chain the front hinge 14 includes a curved surface portion 23 on the front edge. The rear hinge 15 includes a curved surface portion 24 on the rear edge. Also, the front dummy hinge 21 includes a curved surface portion 25 on the front edge, and the rear dummy hinge 22 includes a curved surface portion 26 on the rear edge.

The curved surface portion 23 of the front hinge 14 is connected to the top surface 13 of the top plate 12 by a flat surface portion 27. This flat surface portion 27 extends further toward the front than the central axis C of a pin 20. The flat surface portion 27 of the front hinge 14 is flush with the top surface 13 of the top plate 12, and a boundary between the flat surface portion 27 and the curved surface portion 23 is positioned on the front adjacent link side with respect to the central axis C of a pin 20.

The curved surface portion 24 of the rear hinge 15 is connected to the top surface 13 of the top plate 12 by a flat surface portion 28. This flat surface portion 28 extends further toward the rear than the central axis C of a pin 20. The flat surface portion 28 of the rear hinge 15 is flush with the top surface 13 of the top plate 12, and a boundary between the flat surface portion 28 and the curved surface portion 24 is positioned on the rear adjacent link side with respect to the central axis C of a pin 20.

The curved surface portion 25 of the front dummy hinge 21 is connected to the top surface 13 of the top plate 12 by a flat surface portion 29. This flat surface portion 29 extends further toward the front than the central axis C of a pin 20. The flat surface portion 29 of the front dummy hinge 21 is flush with the top surface 13 of the top plate 12, and a boundary between the flat surface portion 29 and the curved surface portion 25 is positioned on the front adjacent link side with respect to the central axis C of a pin 20.

The curved surface portion 26 of the rear dummy hinge 22 is connected to the top surface 13 of the top plate 12 by a flat surface portion 30. This flat surface portion 30 extends further toward the rear than the central axis C of a pin 20. The flat surface portion 30 of the rear dummy hinge 22 is flush with the top surface 13 of the top plate 12, and a boundary between the flat surface portion 30 and the curved surface portion 26 is positioned on the rear adjacent link side with respect to the central axis C of a pin 20.

Thus, when the links 11 are connected to each other as mentioned above to form an endless chain, the flat surface portion 27 of a front hinge 14, the flat surface portion 29 of a front dummy hinge 21, the flat surface portion of the rear hinge and the flat surface portion of the rear dummy hinge of the adjacent front link are overlapped with each other. And the flat surface portion 28 of a rear hinge 15, the flat surface portion 30 of a rear dummy hinge 22, the flat surface portion of the front hinge and the flat surface portion of the front dummy hinge of the adjacent rear link are also overlapped with each other.

A chain conveyor is configured by this conveyor chain, and when a sprocket is rotated by a motor, the chain is circulated to convey conveying objects on the top plates 12.

When the link 11 is passed through a curved conveying section, the space between a leading edge and the trailing edge of the front adjacent link becomes wide on the outside and narrow on the inside. However, in the conveyor chain according to the present invention the flat surface portions 27, 28, 29 and 30 are extended toward the adjacent link with respect to the central axis C. Accordingly, when the link 11 is passed through a curved conveying section, the front hinge 14, rear hinge 15, front dummy hinge 21 and rear dummy hinge 22 do not form a space between links and the entire surfaces of the chain substantially become flush with each other. Therefore, even if the conveying objects are subjected to the action of external force such as centrifugal force in the curved conveying section to move on the chain, they are moved on the adjacent link without falling down. This will be described below in detail.

Figure 5:
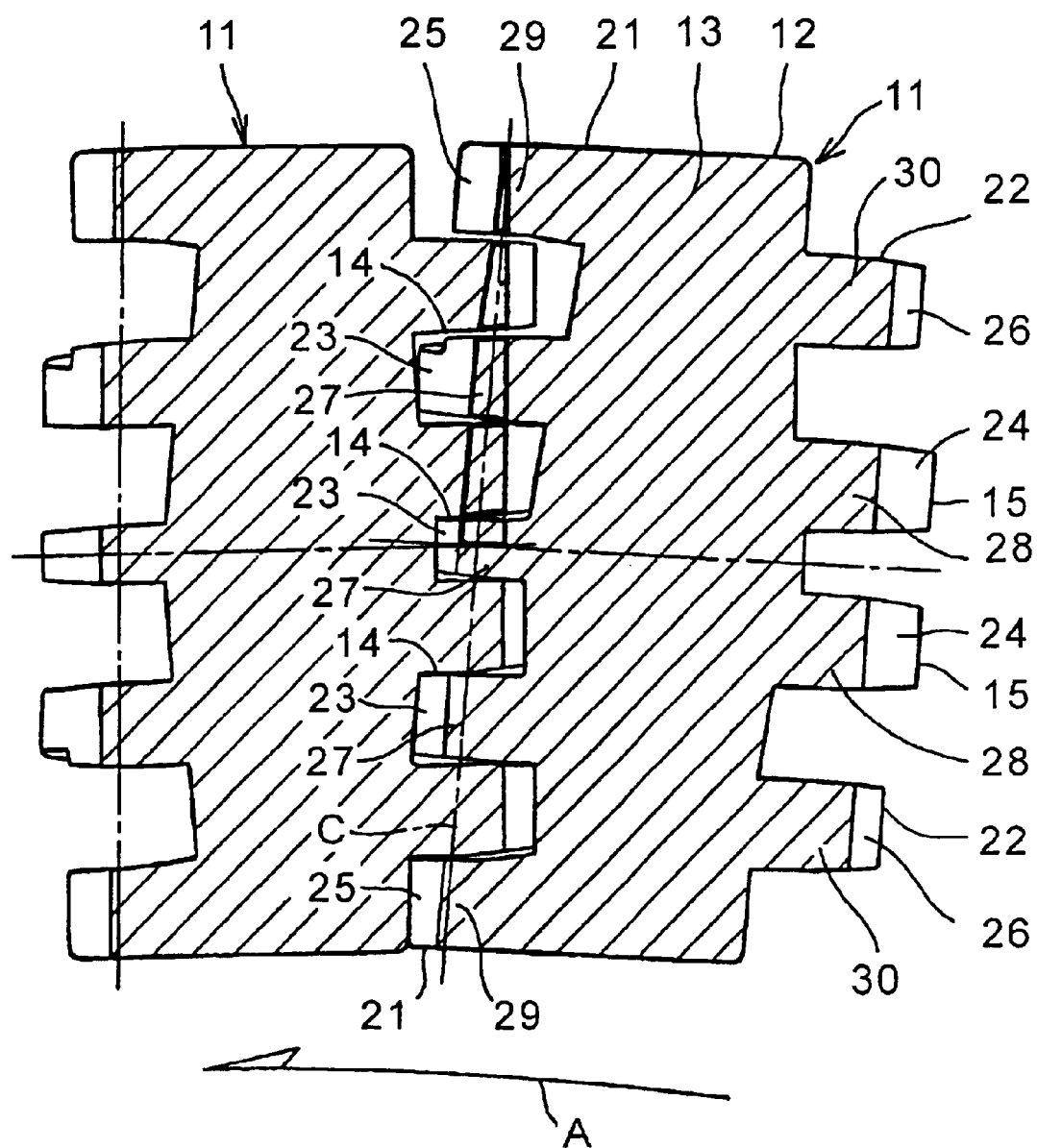
FIG. 5 is an explanatory view showing a sate where the conveyor chain shown in FIG. 1 is in a curved conveying section.

In FIG. 5, the flat surface portions 27, 28, 29 and 30 of the front hinge 14, rear hinge 15, front dummy hinge 21 and rear dummy hinge 22 are shown by hatch lines together with the top surface 13 of a top plate 12.

Among the adjacent link hinges positioned on the front side, the uppermost rear dummy hinge in FIG. 5 is defined as the first rear dummy hinge, the next rear hinge is defined as the second rear hinge, the next lower rear hinge is defined as the third rear hinge, and the lowermost rear dummy hinge is defined as the fourth dummy rear hinge. Then, as shown in FIG. 5, the flat surface portion 29 of the uppermost front dummy hinge 21 in a curved conveying section is overlapped with the flat surface portion of the first rear dummy hinge, the flat surface portion 27 of a front hinge lower than the front dummy hinge 21 is overlapped with the flat surface portion of the first rear dummy hinge and the flat surface portion of the second rear hinge, and the flat surface portion 27 of the central front hinge 14 is overlapped with the flat surface portion of the second rear hinge and the flat surface portion of the third rear hinge. Further, the flat surface portion 27 of a front hinge 14 near the inside of the curved conveying section is overlapped with the flat surface portion of the third rear hinge and the flat surface portion of the fourth rear dummy hinge, and the flat surface portion 29 of the lowermost front dummy hinge 21 is overlapped with the flat surface portion of the fourth rear dummy hinge. The flat surface portion 28 of the rear hinge 15 and the flat surface portion 30 of the rear dummy hinge 22 are also overlapped with the flat surface portion of the front hinge of the rear adjacent link and the flat surface portion of the front dummy hinge, respectively.

Since the flat surface portions 27, 28, 29 and 30 of these hinges 14, 15, 21 and 22 are positioned to be flush with the top surface 13 of the top plate 12, the regions 13, 27, 29 and 30 shown by hatch lines in FIG. 5 form a flat surface. Further, the space between the links is connected in the above-mentioned overlapped manner. As a result, even if conveying objects are subjected to the action of external force such as centrifugal force and moved on the chain during passing through the curved conveying section, they are smoothly moved to the adjacent link without falling down.

Further, since in this conveyor chain, each of the links 11 includes front dummy hinges 21 and rear dummy hinges 22 on both sides of the hinge portion 17, a space reaches minimum in the outside of a curved conveying section produced by a leading edge of the link 11 and a trailing edge of the adjacent link, as shown in FIG. 5.

That is since a front dummy hinge 21 is placed in a space between a leading edge and a portion of the outermost side of the curved conveying section of the front adjacent link and a rear dummy hinge 22 of the front adjacent link is placed in the vicinity of the front dummy hinge 21, a large space is not produced outside the curved conveying section in the leading edge of the link 11 and the trailing edge of the front adjacent link. Therefore conveying objects are not felled down between a link 11 and the adjacent link so that they are moved to the adjacent link without changing their positions at all.

As described above, in the conveyor chain according to the present invention, the hinges 14, 15, 21 and 22 respectively include flat surface portions 27, 28, 29 and 30, overlapped with each other and substantially flush with the top surface 13 of a top plate 12 in the vicinity of a pin 20, which connects the adjacent link, and conveying objects are smoothly moved to the adjacent link without falling. Accordingly, the conveying objects can be conveyed in a curve at high speed.

Further, a front dummy hinge 21 and a rear dummy hinge 22 prevents the generation of a large space between a link 11 and the adjacent link, which is positioned outside a curved conveying section, so that conveying objects do not drop between links. Accordingly, in the present invention the conveying objects can be conveyed in a curve at high speed, and even conveying objects having high center of gravity, such as a pet bottle, and the like, can be conveyed in a curved conveying section at high speed.

The example explained above includes the front dummy hinge 21 and the rear dummy hinge 22 on the top plate 12 and also includes the front hinge 14 and the rear hinge 15 in the link portion 11. However, the example can take another form of links. In that case, a flat surface portion of an engagement portion positioned between links, which is connected to a top plate is extended toward the adjacent link positioned on the front or rear side with respect to a pin.

Effects of the Invention

In the conveyor chain of the present invention having a plurality of links arranged in rows, each of said links including a top plate having a flat top surface and a hinge portion provided on said top plate, said hinge portion being pin-connected to the hinge portions in the adjacent link positioned on the back side, engagement portions with the adjacent links positioned on the front and back sides in said top plate includes a flat surface portion connected to said flat top portion of said top plate, said flat surface portion are extended to said adjacent link, which is positioned on the front or back side with respect to the central axis of said pin and that when said link is passed through a curved conveying section, said engagement portions are overlapped with each other. Accordingly, even if the link is moved in an inclined manner in a horizontal direction in a curved conveying section, the gap between links is reduced, and an area near the pin reaches a flat surface substantially flush with the top surface of the top plate. Therefore, even if a conveying object on the link is subjected to the action of external force when passing through the curved conveying section, it does not fall down and is smoothly moved to the adjacent link. As a result, even a conveying object having high center of gravity such as a pet bottle or the like can be conveyed at high speed without falling down.

Description of Reference Numerals

11 . . . Link
13 . . . Top surface of a top plate
12 . . . Top plate
17 . . . Hinge portion
14 . . . Front hinge
15 . . . Rear hinge
20 . . . Pin
21 . . . Front dummy hinge
22 . . . Rear dummy hinge
27 . . . Flat surface portion of a front hinge
28 . . . Flat surface portion of a rear hinge
29 . . . Flat surface portion of a front dummy hinge
30 . . . Flat surface portion of a rear dummy hinge
C . . . Central axis of a pin

We claim:

1. A conveyor chain having a plurality of links arranged in rows, each of said links includes a top plate having a continuous flat top surface, front and rear hinge portions provided on said top plate, and engagement portions, said front hinge portion of each said link being pin-connected to said rear hinge portion of the adjacent link, said conveyor chain having a curved conveying section, characterized in that each said engagement portions include at least one dummy hinge in each engagement portion, said engagement portions with the adjacent links positioned on the front and back sides in said top plate include continuous flat surface portions connected to said continuous flat top surface of said top plate, said flat surface portions are extended to said adjacent link, which is positioned on the front or back side with respect to the central axis of said pin and that when said link is passed through a curved conveying section, said continuous flat surface portions of said engagement portion are overlapped with each other.

2. A conveyor chain as claimed in claim 1 wherein each said dummy hinge includes a continuous flat surface portion.

* * * * *